US008033597B2

(12) United States Patent  
Griffis et al.

(10) Patent No.: US 8,033,597 B2
(45) Date of Patent: Oct. 11, 2011

(54) GLAZED TRANSIT VEHICLE DOOR OR WINDOW

(75) Inventors: David C. Griffis, Round Lake, IL (US); Peter Heidrich, Des Plaines, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 150 days.

(21) Appl. No.: 12/668,782

(22) PCT Filed: Apr. 1, 2009

(86) PCT No.: PCT/US2009/039104
§ 371 (c)(1),
(2), (4) Date: Jan. 12, 2010

(87) PCT Pub. No.: WO2009/126486
PCT Pub. Date: Oct. 15, 2009

(65) Prior Publication Data
US 2010/0194151 A1  Aug. 5, 2010

Related U.S. Application Data

(60) Provisional application No. 61/044,296, filed on Apr. 11, 2008.

(51) Int. Cl.
*B60J 7/00* (2006.01)
(52) U.S. Cl. .................................................... 296/201
(58) Field of Classification Search ............. 296/201, 296/146.15, 146.16, 146.2; 49/381, 501, 49/504; 52/202, 204.5, 204.591, 204.593, 52/204.62, 208, 656.5, 775, 204.597, 209
See application file for complete search history.

(56) References Cited

U.S. PATENT DOCUMENTS

| | | | |
|---|---|---|---|
| 170,029 A | 11/1875 | Sustins | |
| 282,208 A | 7/1883 | McCurdy | |
| 902,143 A | 10/1908 | Frigone | |
| 1,311,127 A | 7/1919 | Kendrick | |
| 1,342,050 A | 6/1920 | La Jeunesse | |
| 1,345,832 A | 7/1920 | Campbell | |
| 1,424,913 A | 8/1922 | Kahler | |
| 1,578,328 A | 3/1926 | Lessing | |
| 1,780,852 A * | 11/1930 | Sullivan | 52/204.69 |
| 1,785,431 A | 12/1930 | Bailey | |
| 1,913,285 A | 6/1933 | Oliver et al. | |
| 3,072,977 A | 1/1963 | Burda | |
| 3,486,288 A * | 12/1969 | Pyne | 52/844 |
| 3,837,130 A * | 9/1974 | Hildebrandt et al. | 52/204.597 |
| 4,051,633 A * | 10/1977 | Voegele, Jr. | 49/411 |
| 4,364,209 A * | 12/1982 | Gebhard | 52/208 |
| 4,391,020 A | 7/1983 | Hsu | |
| 4,531,335 A | 7/1985 | Mangan | |
| 4,667,440 A | 5/1987 | Grace, Sr. | |
| 4,839,122 A * | 6/1989 | Weaver | 264/129 |
| 5,050,344 A | 9/1991 | Skeem | |
| 5,184,422 A | 2/1993 | Wade et al. | |
| 5,205,095 A * | 4/1993 | Kessler | 52/208 |
| 5,522,180 A | 6/1996 | Adler et al. | |
| 5,551,197 A | 9/1996 | Repp et al. | |

(Continued)

*Primary Examiner* — Kiran B. Patel
(74) *Attorney, Agent, or Firm* — The Webb Law Firm

(57) ABSTRACT

A transit vehicle glazing assembly comprises a window pane, a box-shaped first frame that surrounds the opening covered by the window pane, a second frame sized to fit within the space enclosed by the first frame secured to the window pane by an adhesive, an elastomeric strip positioned in the space between the flanges and a plurality of U-shaped clips securing the second frame to the first frame.

6 Claims, 2 Drawing Sheets

U.S. PATENT DOCUMENTS

| | | | |
|---|---|---|---|
| 5,584,526 A * | 12/1996 | Soldner | 296/146.15 |
| 5,704,173 A | 1/1998 | Repp et al. | |
| 5,853,895 A | 12/1998 | Lewno | |
| 5,966,874 A | 10/1999 | Repp et al. | |
| 6,068,719 A | 5/2000 | Lewno | |
| 6,128,860 A | 10/2000 | Repp et al. | |
| 6,298,606 B1 | 10/2001 | Repp et al. | |
| 6,312,043 B1 | 11/2001 | Blackburn et al. | |
| 6,319,344 B1 | 11/2001 | Lewno | |
| 6,412,225 B1 * | 7/2002 | McManus | 49/381 |
| 6,550,186 B2 | 4/2003 | Haq | |
| 6,581,354 B1 * | 6/2003 | Skarpness | 52/773 |
| 6,829,861 B1 | 12/2004 | Kobrehel et al. | |
| 6,869,128 B2 | 3/2005 | Farrar et al. | |
| 6,871,450 B2 | 3/2005 | Repp et al. | |
| 6,941,700 B1 | 9/2005 | Kobrehel et al. | |
| 7,080,874 B2 | 7/2006 | Farrar et al. | |
| 7,082,736 B2 * | 8/2006 | Farrar et al. | 52/741.1 |
| 7,138,184 B2 | 11/2006 | Clerici et al. | |
| 7,143,546 B2 | 12/2006 | Griffis et al. | |
| 7,152,906 B1 | 12/2006 | Farrar et al. | |
| 7,188,399 B2 | 3/2007 | Campus et al. | |
| 7,320,496 B2 | 1/2008 | Griffis et al. | |
| 7,332,225 B2 | 2/2008 | Lewno | |
| 2001/0032422 A1 | 10/2001 | Farrar | |
| 2004/0145214 A1 | 7/2004 | Farrar et al. | |
| 2004/0231255 A1 * | 11/2004 | Silverman | 52/204.6 |
| 2006/0130403 A1 | 6/2006 | Krehbiel et al. | |
| 2007/0033875 A1 | 2/2007 | Griffis et al. | |
| 2010/0018140 A1 * | 1/2010 | Brunnhofer et al. | 52/204.71 |

* cited by examiner

GLAZED TRANSIT VEHICLE DOOR OR WINDOW

BACKGROUND OF THE INVENTION

Field of the Invention

This invention relates to transit vehicle windows and doors that are easily installed and replaced.

Description of Related Art

Modern transit vehicles have windows and doors that match the smooth exterior of the vehicle. In other words, the exterior surface of the doors and windows are not set back into the exterior wall of the vehicle. The glazing is typically secured by adhesives to a frame within the window opening or door panel. One technique involves permanently bonding the glazing in the window opening or to door panels with adhesives. This makes replacement of the glazing a time and labor-intensive undertaking because the adhesive must be allowed to cure fully before the vehicle can be put back in service.

There are a number of proposed quick replacement techniques for securing an intermediate frame to which the glazing is secured within the openings including hinges and bolts. U.S. Pat. No. 6,412,225 entitled "Window Assembly" discloses one such technique. U.S. Pat. No. 6,312,043 entitled "Flush-Mounted Frameless Vehicle Window" discloses yet another. A drawback of some systems is that the means for securing the intermediate frame to which the glazing is adhered exposes bolts and other complicated fastening apparatus to the view of passengers and invites tampering.

SUMMARY OF THE INVENTION

It is an advantage of this invention to provide a quick replacement method and apparatus for securing an intermediate frame to which glazing is bonded by adhesives to a wall frame or a door panel frame with clips that blend well into both the intermediate frame and the wall or door panel frame so as to be unobtrusive and even aesthetically pleasing. The clips can be easily installed and removed in the garage but are substantially tamperproof to the public.

Briefly, according to one embodiment of this invention, there is provided a transit vehicle glazing assembly comprising a first frame, a second frame sized to fit within the first frame having the window pane secured thereto by adhesives, and a plurality of U-shaped clips. The first frame extends inwardly from the interior surface of the window pane and has a flange extending into the open space within the frame. The second frame is fabricated from a channel having first and second channel legs. An elastomeric strip is wedged in the space between the flange extending from the first frame and an adjacent channel leg. The plurality of U-shaped clips is forced over the flange extending from the first frame and a channel leg thus securing the second frame to the first frame.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
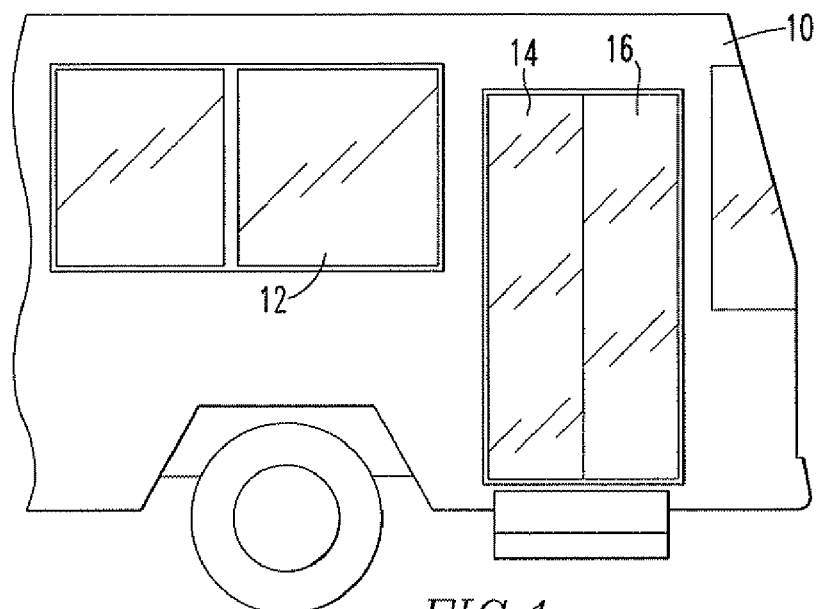
FIG. 1 is a schematic drawing of the front end of a bus showing a window and glazed door.

Referring now to FIG. 1, there is shown the front of a bus 10 having a glazed window 12 and a door with glazed door panels 14 and 16. While this invention applies equally to windows and door panels, the preferred embodiment hereafter described will be explained with reference to a glazed door panel.

Figure 5:
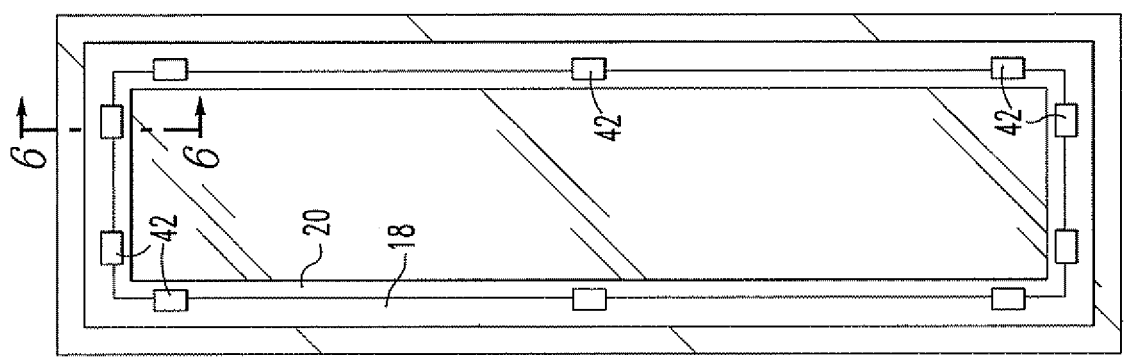
FIG. 5 is a schematic drawing of the interior of an assembled window or door assembly according to this invention.
Figure 4:
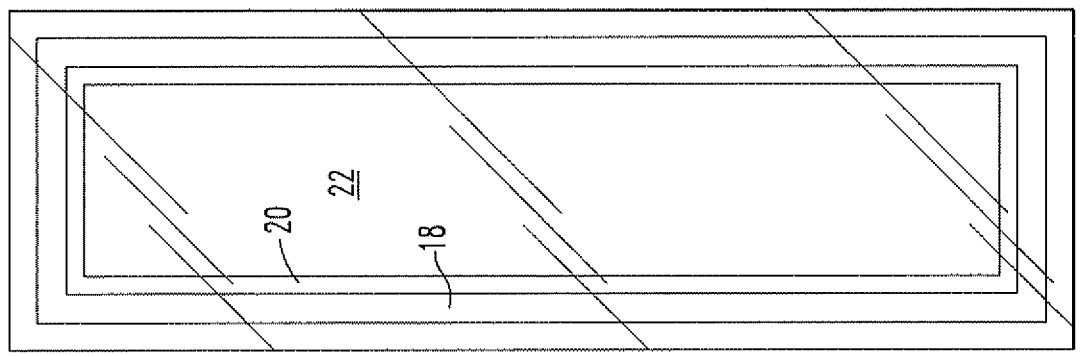
FIG. 4 is a schematic drawing of the exterior of an assembled widow or door assembly according to this invention.
Figure 2:
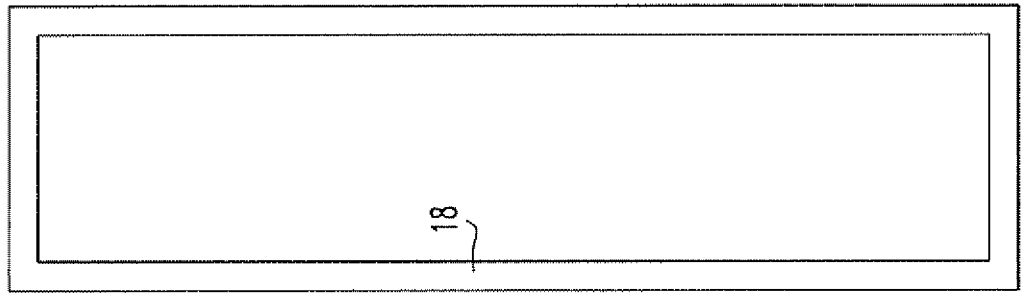
FIG. 2 is a schematic drawing of a frame for being secured to a transparent pane.
Figure 3:
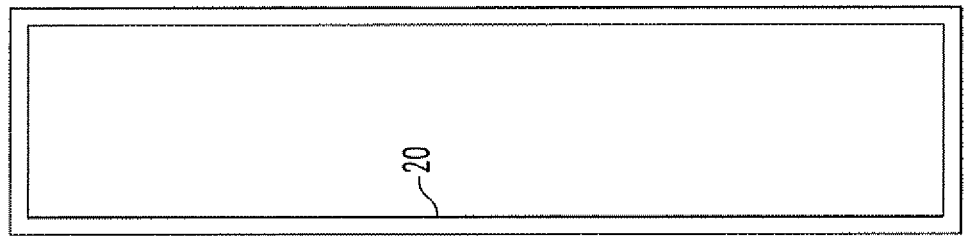
FIG. 3 is a schematic drawing of a frame for being fixed or hung in a window or door opening.

FIG. 2 shows a door frame 18 for a door panel for being hung for opening and closing. FIG. 3 shows a smaller hidden frame 20 for being adhesively attached to a transparent pane to form a door panel and for fitting within frame 18. FIG. 4 shows the exterior view of a glazed door according to this invention in which the door frame 18 and smaller frame 20 can be seen through the transparent panel 22. FIG. 5 shows the interior view of a glazed door according to this invention and the potential location of the clips 42 that secure the smaller frame 20 to the door frame 18 for rapid installation and removal. FIGS. 2 to 5 do not show all the details but are for the purpose of understanding the general arrangement of the elements identified.

Figure 6:
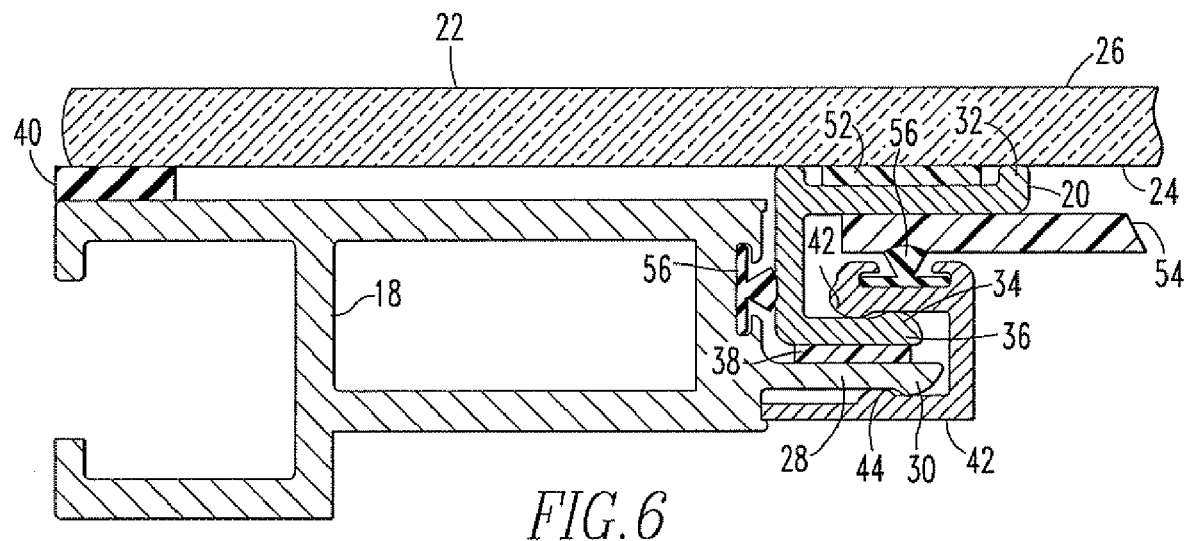
FIG. 6 is a section-view taken along line 6-6 in FIG. 5 through the glazing assembly according to this invention.

FIG. 6 is a section view illustrating the details of one embodiment of this invention. The window pane or transparent panel 22 has an interior surface 24 and exterior surface 26. An extruded box-shaped door frame 18 surrounds the opening covered by the window pane and is fixed or hung for opening or closing. The door frame extends inwardly from the interior surface of the window pane. The door frame has a flange 28 extending into the opening defined by the frame. The flange has a detent 30 near the end of the flange facing away from the window pane.

A second frame 20 is sized to fit within the space enclosed by the first frame 18 and is fabricated from a channel facing the opening. The second frame has a first channel leg 32 secured to the window pane by an adhesive 52 and a second channel leg 36 spaced from and generally parallel to the flange 28 extending from the door frame. The first channel leg 32 of the first frame adjacent the window pane has a recessed surface for receiving adhesive. The second channel leg 36 has a detent 34 near the end thereof facing toward the window pane. The first channel leg 32 of the second frame is longer than the second channel leg 36.

An elastomeric foam strip 38 is positioned in the space between the flange 28 extending from the first frame and the second channel leg 36 of the second frame. It may be held by adhesive to either the first or second frame. Another elastomeric foam strip 40 is positioned at the edge of the interior surface 24 of the panel 22 and the door frame 18.

A plurality of U-shaped clips 42 having facing detents 44, 46 are forced over the flange 28 extending from the first frame and the second channel leg 36 of the second frame and securing the second frame to the first frame. The U-shaped clip has two generally parallel legs 48, 50 of different lengths, the longer leg being positioned further away from the window pane and having an end abutting the first frame.

In order to improve the exterior appearance, black ceramic frit is applied to the inner surface of the transparent glass pane in a band of sufficient width to prevent the second hidden frame and the door frame from being visible from outside the vehicle.

During installation, the assembly comprising the second frame 20 and transparent panel 22 is inserted in the opening created by the door frame 18. The subsequent installation of the clips 42 draws the assembly closer to the door frame 18 compressing the elastomeric foam strips 38 and 40. The clips are retained by the interaction of the detents 30, 34, 44, and 46. The resistance to compression of the elastomeric foam strips 38 keep the detents engaged preventing the easy removal of the clips.

An optional anti-grafitti liner 54 may be installed and retained by reason of the rectangular opening created by installation of the clips 42. It is installed by bending it slightly (but not permanently) so that it fits inside the opening within the frames. Pile weather stripping 56 applies pressure to the liner to keep it from rattling. The anti-grafitti liner 54 is meant to be a sacrificial part in the attempted vandalism of the glass panel.

Having thus defined our invention in the detail and particularity required by the Patent Laws, what is desired protected by Letters Patent is set forth in the following claims.

The invention claimed is:

1. A transit vehicle glazing assembly comprising:
    a window pane having an interior and exterior surface;
    a box-shaped first frame that surrounds the opening covered by the window pane and is fixed or hung for opening or closing, the first frame extending inwardly from the interior surface of the window pane and having a flange extending into the opening spaced from the window pane, said flange having a detent near the end of the flange facing away from the window pane;
    a second frame sized to fit within the space enclosed by the first frame fabricated from a channel facing the opening, said second frame having a first channel leg secured to the window pane by an adhesive and a second channel leg spaced from and generally parallel to the flange extending from the first frame, said second channel leg having a detent near the end thereof facing toward the window pane;
    an elastomeric strip positioned in the space between the flange extending from the first frame and the second channel leg of the second frame; and
    a plurality of U-shaped clips having facing detents forced over the flange extending from the first frame and the second channel leg of the second frame and securing the second frame to the first frame.

2. The glazing assembly according to claim 1, wherein the first channel leg of the first frame adjacent the window pane has a recessed surface for receiving adhesive.

3. The glazing assembly according to claim 1, wherein the first channel leg of the first frame is longer than the second channel leg.

4. The glazing assembly according to claim 1, wherein the U-shaped clip has two generally parallel legs of different lengths, the longer leg being positioned further away from the window pane and having an end abutting the first frame.

5. The glazing assembly according to claim 4, wherein the shorter leg of the clip is spaced from and generally parallel to the first channel leg of the second frame permitting the capture of an anti-graffiti liner therein.

6. The glazing assembly according to the claim 5, wherein the shorter leg of the clip has a recess for capturing an elastomeric seal.

* * * * *

UNITED STATES PATENT AND TRADEMARK OFFICE
CERTIFICATE OF CORRECTION

PATENT NO. : 8,033,597 B2
APPLICATION NO. : 12/668782
DATED : October 11, 2011
INVENTOR(S) : David C. Griffis et al.

It is certified that error appears in the above-identified patent and that said Letters Patent is hereby corrected as shown below:

In the Claims:

Column 4, Line 17, Claim 2, delete "first" and insert -- second --

Signed and Sealed this
Nineteenth Day of August, 2014

Michelle K. Lee
*Deputy Director of the United States Patent and Trademark Office*